United States Patent [19]

Stievenart et al.

[11] 4,210,816

[45] Jul. 1, 1980

[54] APPARATUS FOR UNLOADING RADIOGRAPHIC CASSETTES IN DAYLIGHT

[75] Inventors: Emile F. Stievenart, Hoboken; Hendrik S. Plessers, Boechout; Georges J. Neujens, Merksem, all of Belgium

[73] Assignee: Agfa-Gevaert N.V., Mortsel, Belgium

[21] Appl. No.: 932,628

[22] Filed: Aug. 10, 1978

Related U.S. Application Data

[63] Continuation of Ser. No. 742,636, Nov. 17, 1976, abandoned.

[30] Foreign Application Priority Data

Nov. 20, 1975 [GB] United Kingdom .............. 47807/75

[51] Int. Cl.² ............................................. G11B 1/00
[52] U.S. Cl. .................................................. 250/468
[58] Field of Search ............................. 250/468, 470

[56] References Cited

U.S. PATENT DOCUMENTS

| | | | |
|---|---|---|---|
| 3,105,903 | 10/1963 | Sano | 250/468 |
| 3,191,031 | 6/1965 | Sano | 250/468 |
| 3,891,854 | 6/1975 | Hura | 250/468 |
| 3,900,405 | 8/1975 | Bartlett | 250/468 |
| 3,912,932 | 10/1975 | Matsumoto | 250/468 |

Primary Examiner—Craig E. Church
Attorney, Agent, or Firm—William J. Daniel

[57] ABSTRACT

A film cassette unloading apparatus comprises a cassette positioning mechanism located in a light-tight housing. Within the housing is provided a platform onto which the cassette is placed bottom side up. An unlocking mechanism, adapted for the particular type of cassette unlocks same. Then, an opening mechanism engages the rim of the bottom part and lifts the bottom part in upward direction, thereby performing a partial rotation around the hinge-point of the cassette. By mounting the platform in inclined position, the film which is contained in the cassette, falls out of the latter by gravity.

7 Claims, 8 Drawing Figures

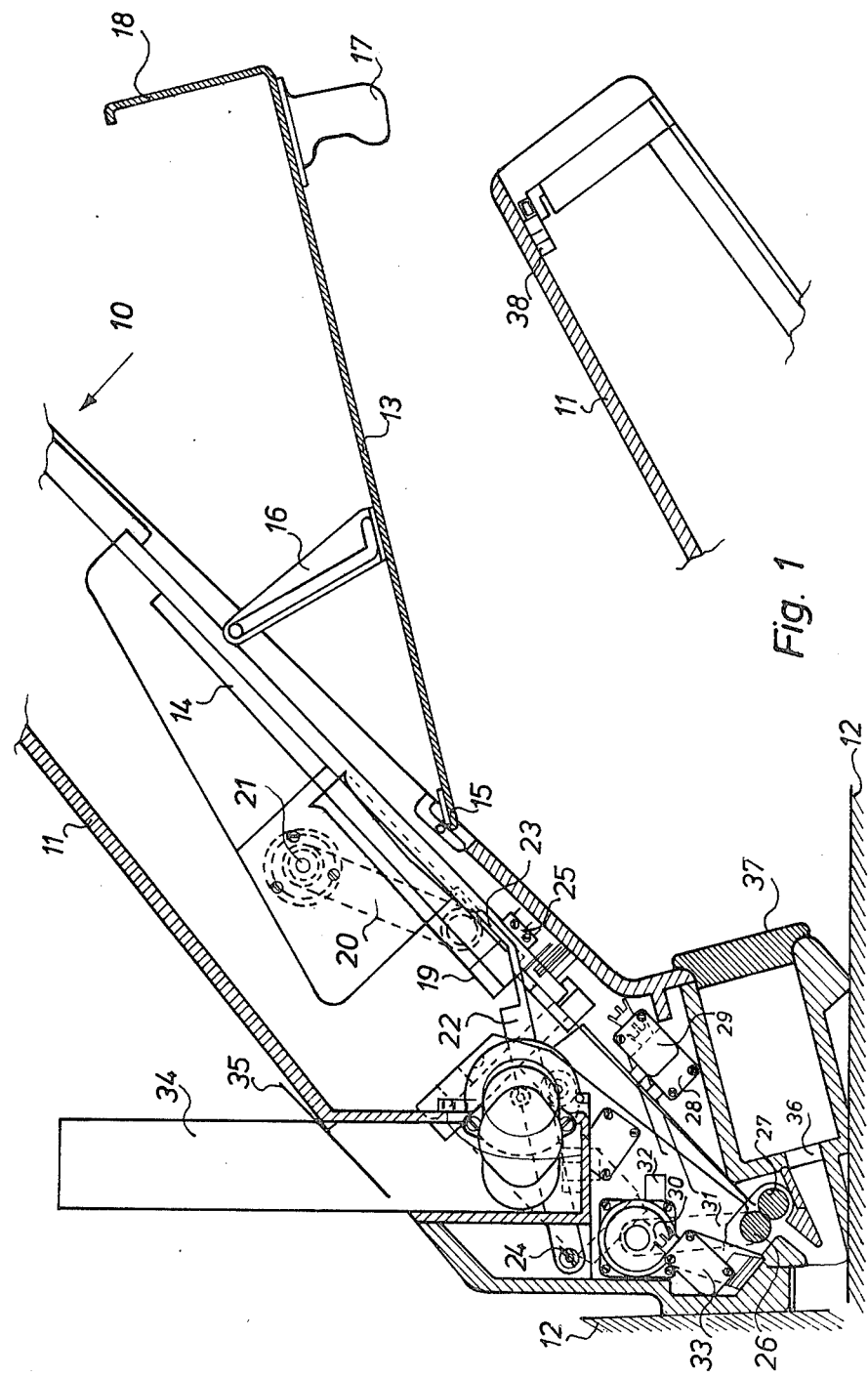

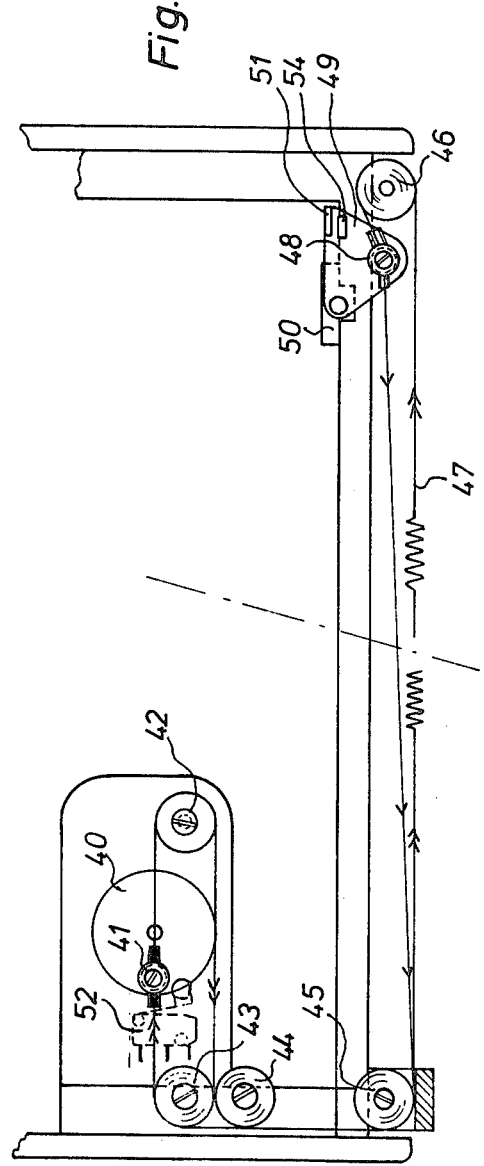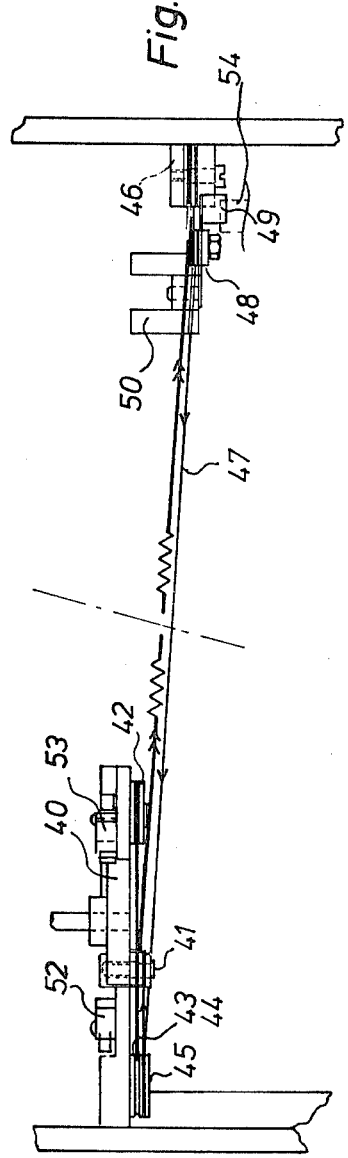

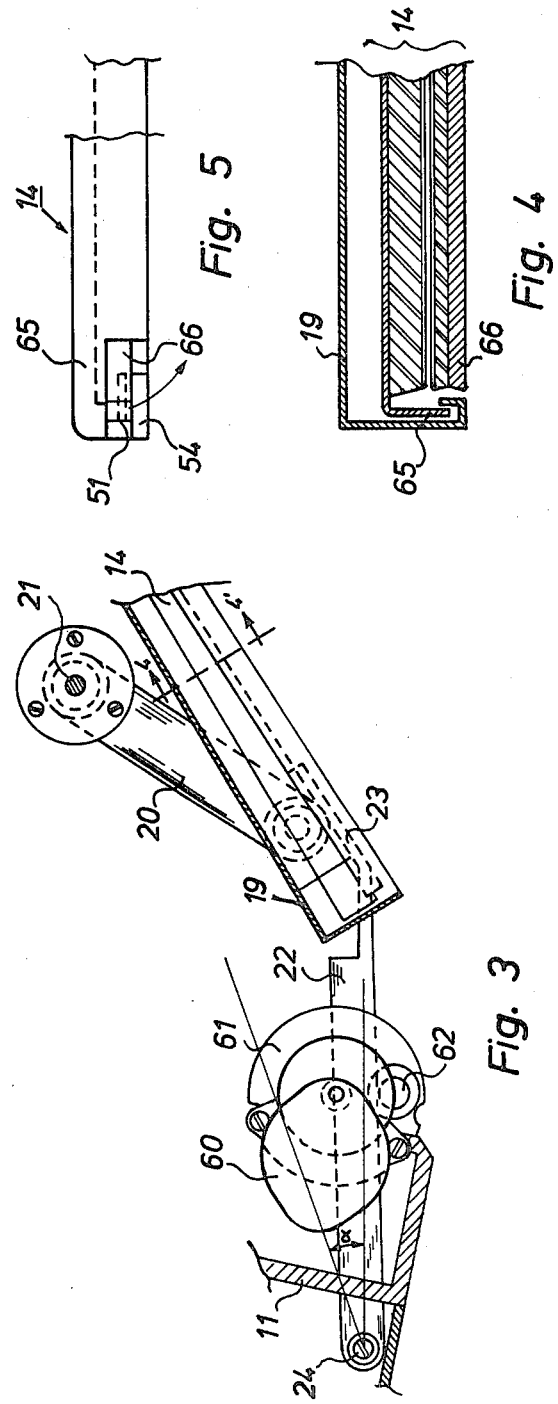

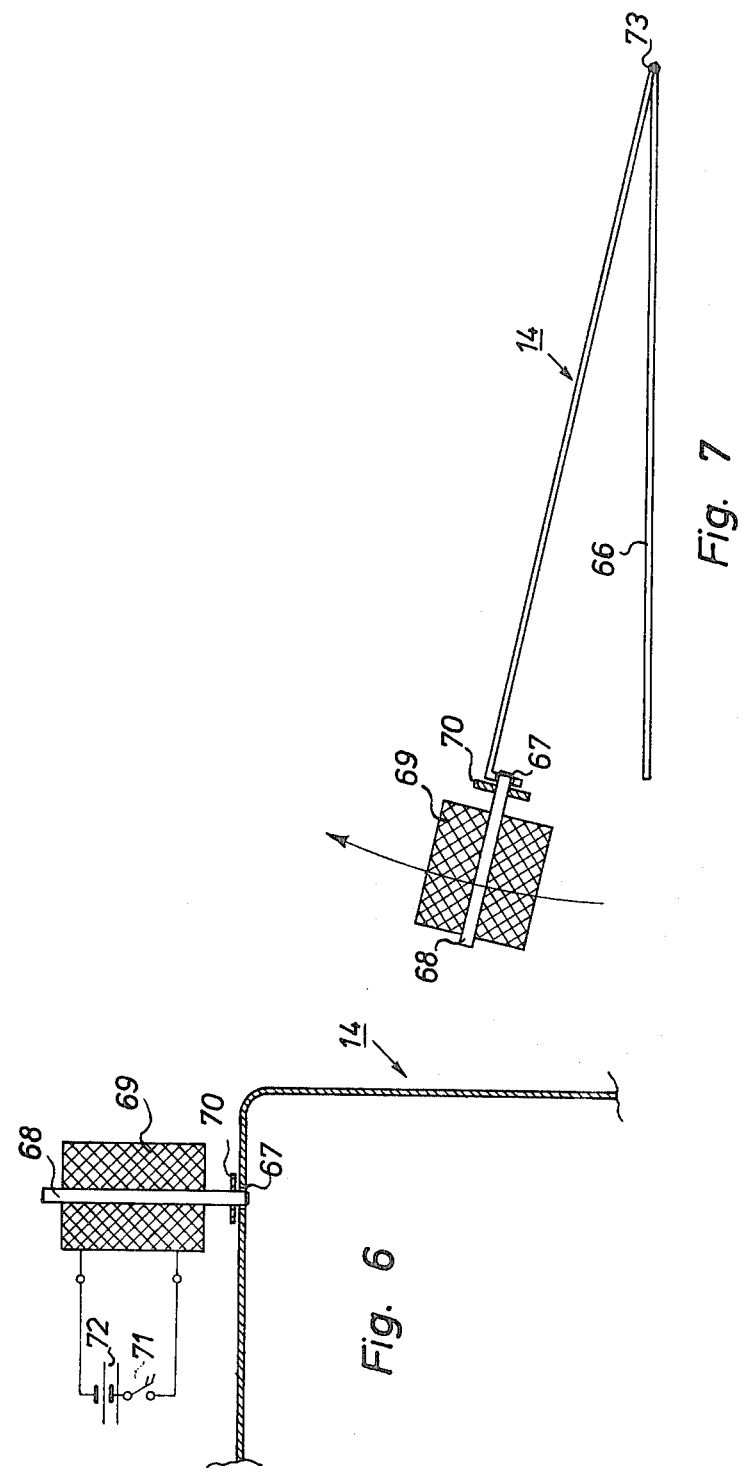

APPARATUS FOR UNLOADING RADIOGRAPHIC CASSETTES IN DAYLIGHT

This is a continuation of Ser. No. 742,636, filed Nov. 17, 1976, now abandoned.

This invention relates to apparatus for automatically unlatching and opening radiographic film cassettes.

Apparatus of this type is used for example in medical centres where large numbers of radiographs have to be processed each day. The cassettes containing exposed radiographic film sheets are placed in a predetermined position in the unlatching and opening apparatus which operates in conjunction with some kind of film transfer device whereby the film sheets are automatically transferred from the cassettes into a processing station in which the film sheets are automatically developed.

The present invention provides a cassette unlatching and opening apparatus which departs from conventional practice in that it is designed to receive and handle cassettes in an inverted or bottom side up orientation.

Radiographic cassettes of different standard designs are in use but most, if not all of such cassettes are alike in comprising two hinged parts, namely a tray-like container body which receives the film sheet, and a hinged lid which can be fastened in closed position by fastening or latching means at the cassette front (i.e. the cassette side opposite the lid hinge). The lid comprises a top plate which closes into a position inside the peripheral walls of the container body and which itself has no depending wall or flange, at least not at its front edge. The present invention is concerned with apparatus for unfastening and opening cassettes constructed in this way Such cassettes are hereafter identified to as "cassettes of the type referred to".

The apparatus according to the invention has a cassette receiver or support for receiving a cassette of the type referred to in inverted orientation, with the bottom of the container body facing generally upwards, such receiver having or being associated with locating means for locating the cassette in predetermined position in such receiver; a cassette unfastening mechanism for automatically unfastening a cassette located in such predetermined position, and means for automatically opening an unfastened cassette, while it is in said predetermined position, by pivoting the container part of the cassette upwardly about its hinge while its lid remains stationary.

When a cassette containing a radiographic film sheet is opened by apparatus according to the invention, the film sheet is resting on the inside surface of the cassette lid. Because of this fact, it is much easier to achieve reliable automatic delivery of the film sheet to a predetermined position outside the cassette, as compared with conventional apparatus such as described in U.S. Pat. No. 3,105,903 of Ka Sano and Willy Karel Van Landeghem issued Oct. 1, 1963 in which the film sheet lies within the container part of the cassette. In a preferred apparatus according to the invention, the receiver is disposed so that when a cassette is in position therein the cassette is in an inclined position with its front end lowermost, the inclination being such that on opening of the cassette the film sheet will slide forwardly out of the cassette, along the inner surface of the cassette lid. An inclined ramp may be arranged forwardly of the cassette receiver so that the film sheet leaving the cassette slides directly onto and down such ramp to a delivery point.

The invention as hereinbefore broadly defined includes apparatus having any one or more of the following further features which are recited as examples of optional features affording special advantages.

(1) The cassette unfastening and opening apparatus is in the form of a unit which can be mounted as such at the entrance of a radiographic film sheet processing machine and includes a film sheet transfer means for effecting automatic delivery of a film sheet from an opened cassette through an exit point of the unit from which the sheet can enter a said processing machine. The transfer means may comprise an inclined ramp as already referred to. Film sheet transport rollers may be provided adjacent such ramp for positively propelling the film sheets from the apparatus.

(2) The cassette unfastening and opening apparatus is in the form of a unit having a light-tight housing within which the unfastening and opening mechanism is accommodated, the housing having a door, shutter or analogous means via which access can be gained to the interior of the housing for inserting a loaded cassette into the cassette receiver and withdrawing the cassette after removal of the film sheet therefrom. It is an advantage if the apparatus can be operated in daylight conditions. If feature (1) above is employed, the cassette unfastening and opening unit can be fitted to a film sheet processing machine installed in daylight or in a brightly illuminated room, e.g., in a medical operating theatre where the processed radiographs will be directly available for inspection. The aforesaid unit housing may have a separate film sheet feed passage, closable by a light-tight cover, via which a film sheet can be fed (in the dark) directly into a processing machine.

(3) The cassette opening mechanism includes a part disposed and operating so as to exert upward cassette opening force on one or more of the side and front walls of the container part of the cassette.

(4) The cassette receiver is formed with an upwardly opening guide channel for receiving a side wall of the container part of a cassette when this is inserted into the cassette receiver, and the cassette opening mechanism operates by tilting the receiver to cause it to lift such container part.

(5) The cassette opening mechanism includes a lever which is pivotally mounted and operates to make contact and raise a component which engages the container body of a cassette when this is in correct position in the cassette receiver. Such component may be the receiver or a component part of the receiver. The pivotal movement of the lever may be achieved by some form of cam mechanism, e.g. by a motor-driven disc having a projection on which the lever slidingly rests.

(6) The cassette unfastening mechanism includes one or more members for applying opening force on the operating lever of each cassette fastener, such member or members being located in such relationship to the cassette receiver that as a fastened cassette is inserted into the predetermined position in such receiver, a portion of the or each lever passes below the or a said member. For example each said member of the cassette unfastening mechanism may be part of or carried by a pivotally mounted component which is connected by one or more belts, cords or analogous means to a motor-driven disc or other rotatable part so that during a rotation of the latter said component is moved pivotally in a direction which causes displacement of the related cassette fastener lever into open position.

Reference has been particularly made herein to apparatus wherein displacement of a film sheet from an opened cassette takes place by sliding movement of the film sheet under gravity.

Instead of providing a cassette opening mechanism which operates by exerting upward force on one or more of the side and front walls of the container part of the cassette, the cassette opening mechanism of apparatus according to the invention may operate in some other way. For example such mechanism may incorporate one or more suction cups which act against the exterior bottom surface of the container part of the cassette.

Although reference has been particularly made to the use of apparatus according to the invention in direct association with a film sheet processing machine, apparatus according to the invention can be used for other purposes, e.g., it can be used in combination with a magazine for temporarily storing exposed film sheets preparatory to bulk processing of the contents of the magazine.

Certain embodiments of the invention, selected by way of example, are illustrated in the accompanying diagrammatic drawings, wherein:

FIG. 1 is a cross-sectional view of an apparatus according to the invention;

FIG. 2a and 2b show part of the mechanism for unlocking a cassette;

FIG. 3 is a view of the mechanism for opening a cassette;

FIG. 4 is a cross-section on line 4—4' of FIG. 3;

FIG. 5 shows a possible relationship between the cassette container, lid and fastening lever, and a member for unfastening the cassette;

FIGS. 6 and 7 are detail views representing the operation of an alternative form of a cassette opening mechanism.

The illustrated apparatus is designed for unfastening and opening radiographic film cassettes in daylight conditions and for feeding the film sheets from the open cassettes into the entrance slot of a processing machine.

The apparatus 10 comprises a housing 11, fixedly secured by known means to the frontside 12 of a processing machine or another device for storing exposed radiographic films (the details of which apart from side wall 12 are not shown). The housing is provided with a hinged flap 13 which can be hinged upwardly from the illustrated position to close the housing light-tightly. The hinge component on the flap engages slots in the body of the housing so that the flap after being hingedly closed can receive a slight translational movement, imparted via its handle 17, for locking the flap. The flap is supported in its open position by a strut 16 having a slot in which a pin on the housing body engages.

In order to load the apparatus, a cassette containing a radiographic film sheet is inserted into a guide 19 located within the housing 11, the flap 13 of course being open. The cassette is inserted into the guide 19 front end first and in inverted orientation, i.e. with its lid facing downwardly. The front end of the cassette is the end where the cassette fastener(s) is or are located. As will become apparent from the later description the guide 19 serves a dual purpose. It locates the cassette in a predetermined lateral position within the housing of the apparatus, and it serves for holding and upwardly hinging the container portion of the cassette. As shown in FIGS. 1 and 3 the guide 19 is pivotally connected to an arm 20 which itself is freely rotatable around a shaft 21.

The cycle for unfastening, opening and unloading the cassette 14 is started when a hook portion 18 on the vertical rear wall of the flap 13 engages the actuating arm of microswitch 38. If desired, this start may be indicated by means of suitable control signals (not represented in the drawing) and the closing of the microswitch 38 may also actuate a supplementary locking mechanism for locking the housing flap closed and thus prevent accidental opening thereof.

When the cassette is in correct position in the guide 19, the cassette engages the contact of a microswitch 25 in an operating circuit of a cassette unfastening mechanism. On commencement of the unfastening and opening cycle this unfastening mechanism is started and operates to release the cassette fastener(s). The details of this unfastening mechanism will be described later with reference to FIG. 2. p Once the cassette fastener(s) has or have been released a lever 22 having an end portion 23 is caused to swing upwardly about a spindle 24. The lever portion 23 engages the guide 19 and causes it to tilt upwardly as permitted by its aforesaid pivotal connection with shaft 21 via arm 20 and by the manner of its engagement with the container part of the cassette.

As the cassette is in an inclined position, the film sheet within the cassette falls out of it as the cassette is opened. The film sheet slides downwardly along the inside face of the cassette lid and travels on downwardly towards rollers 26 and 27 which will feed it through the entrance slot in wall 12 of a processing machine. During its descent the film engages the contacts of microswitches 28 and 29. One of these microswitches controls the rotation of a motor 30 which drives the rollers 26, 27 via a driving belt. The other microswitch activates an identification unit 34 functioning as described hereinafter.

When the film sheet reaches the nip of rollers 26, 27 they are stationary. The motor circuit includes a timer 32 which delays effective rotation of the rollers 26, 27 until a few seconds after the impact of the film sheet against such rollers. If the film sheet is skewed when it contacts the rollers it becomes squared before the resulting rotating movement of the rollers commences. Consequently it is ensured that the sheet is properly orientated in its own plane before it becomes advanced to the processing machine.

In a preferred embodiment of the apparatus, the time delay between impact of the film against the transporting rollers and the commencement of film advance by such rollers amounts to five seconds. If desired, the time switch 32 may be of a double cycle type and operates first to start the rollers rotating in reverse sense when the film sheet first contacts the rollers, then to stop the rollers and subsequently to start rotation of the rollers forwardly for propelling the film sheet into the processing machine. It will be appreciated that in the second case the chance of a film sheet being advanced by the rollers in skewed condition is even less than in the case that the rollers are driven forwardly initially. Instead of the pair of rollers 26, 27 sheet transporting means of some other kind can be used, such as a pair of endless belts.

As the film sheet is driven forwardly by the rollers 26, 27, the leading end of the film sheet contacts the arm of a microswitch 33 which keeps the roller driving motor in operation until the trailing edge of the film sheet has passed. The apparatus is then ready for another feeding cycle. Microswitch 33 may also control release of the supplementary locking mechanism for the housing flap 13 so that this can be slightly retracted and hinged open to enable another cassette to be inserted into the apparatus. Each time a microswitch is actuated, signal means may be energized in order to enhance the ergonomic characteristics of the apparatus.

The identification unit 34 serves to print supplementary information upon the film sheets to be processed. The unit may comprise a flash unit, a small optical system and a holder for the original bearing the data to be printed, e.g., a card 35 bearing typewritten data. The released film sheet travels along the image plane of the optical system. The flash unit may be operated automatically when the leading edge of the film sheet contacts the arm of one of the microswitches 28 and 29 as already mentioned.

If desired, the apparatus 10 may be provided with a separate passageway 36 through wich exposed film sheets may be directly fed into the processing machine from a darkroom. When using the apparatus in daylight or artificial light, the passageway 36 has to be screened off, e.g., by means of a cover 37.

In FIGS. 2a and 2b is represented the mechanism for unfastening the cassettes. This mechanism comprises a disc 40 driven by suitable motor means (not shown). The disc carries a pin 41 to which a flexible driving belt 47 is attached. (A cord or other suitable member may be used instead of a belt). The belt is supported by pulleys 42, 43, 44, 45 and 46 and is connected with a pin 48 provided to a rocker 49. The rocker 49 is pivotally mounted on a fixture 50 having an abutting lug 51. During a complete rotation of the disc 40, the rocker 49 is caused by virtue of its attachment to the belt 47 to oscillate about its pivot. The rocker first rocks clockwise in the aspect of FIG. 2a so that the abutting lug 51 moves downwardly. Each cassette has a pivoted fastener-release lever (54 in FIG. 5) which when the cassette is in its inverted position has to be swung downwardly about its pivot in order to release the fastener. The location of the abutting lug 51 in the apparatus is such that when the cassette is inserted into the guide 19 (FIG. 1) as hereinbefore described the fastener-release lever passes below such lug as suggested in FIG. 5. During the clockwise movement of rocker 49 as above described, the lug 51 abuts against the fastener-release lever and moves it into its release position.

For the sake of simplicity, the apparatus chosen for illustration is one for unfastening and opening cassettes having only one fastener at its front end. The mechanism represented in FIGS. 2a and 2b extends transversely of the apparatus in front of the cassette guide 19 (FIG. 1) so that the position of lug 51 coincides with the single fastener. If the unfastening apparatus is required for handling cassettes with twin fasteners, e.g. one at or adjacent each front end corner of the cassette, two unfastening mechanisms as described with reference to FIGS. 2a and 2b will be provided, one for each fastener.

As appears from FIG. 2b, two microswitches 52, 53 are located adjacent the disc 40. The actuating arms of these switches are contacted by the rim of the disc. This rim is formed with one or more recesses which when in register with a microswitch arm allow it to move to open or close the switch. In this manner one or more operations in the cycle of the apparatus can be controlled. For example switch 52 may operate to stop the disc motor after one complete revolution and switch 53 may initiate a next step in the cycle of the apparatus.

The next step in the cycle is the opening of the cassette 14. As already mentioned the cassette guide 19 participates in this operation. As appears from FIG. 4, the guide 19 has a depending side wall at the bottom of which is an upwardly opening internal channel. When a cassette is pushed into the guide, the free edge of one side wall 65 of the container section of the cassette travels within this internal channel. Between the side wall 65 and the closed cassette lid 66 there is sufficient clearance to accommodate to the inner side wall of the said channel. It will now be apparent that when the guide 19 is tilted upwardly by the action of lever 22 the guide will carry with it the container section of the cassette.

FIG. 3 shows how the lever 22 is operated. The lever is pivoted on a shaft 24 under the influence of a motor 60 which drives a disc 61, if desired through the intermediary of a reduction gear (not shown). On the disc 61 a support 62 is provided upon which the lever 22 rests. The support 62 may e.g., be in the form of a small roller in order to reduce friction between the lever 22 and the support 62 to a minimum. During one complete revolution of the disc 61, the lever 22 oscillates through a certain angle, the amplitude of its movement being sufficient to ensure that the container section of the cassette is raised far enough to allow unimpeded sliding movement of the film sheet out of the cassette.

The alternative form of a cassette opening mechanism represented by FIGS. 6 and 7 is intended for opening cassettes having a hole formed in the front wall of the container part of the cassette. The mechanism comprises a solenoid having a coil 69 and an axially displaceable core 68 for entering a hole 67 in such front wall of the cassette 14. The solenoid coil is energised via an electric circuit including a switch 71 and a battery 72. The solenoid is mounted on a carrier (not shown) which can be displaced by a suitable mechanism for opening the cassette. Such mechanism may e.g., operate in a similar way to the mechanism comprising lever 22 in the apparatus described with reference to FIGS. 1 to 5. Prior to the commencement of an operative cycle of the cassette unfastening and opening apparatus, the solenoid is in such a position in the apparatus that its core is in direct alignment with the hole 67 in the container part of the cassette when the cassette occupies the predetermined position ready to be unfastened. In this case the cassette carrier may merely comprise a cassette support and guide means for laterally locating the cassette in its predetermined position. On energisation of the solenoid, the core 68 enters the hole 67, this movement being limited by abutment of a collar 70 on the core against the wall portion surrounding the hole. Then the solenoid displacing mechanism is operated to cuase upward movement of the solenoid as indicated in FIG. 7 and consequential upward hinging movement of the container body of the cassette about its hinge 73. The solenoid switch 71 can be actuated by the cassette as it is pushed into its predetermined position within the apparatus or can be actuated in the same way as switch 53 (FIG. 2b) in the apparatus described earlier so that the solenoid is energised on completion of the cassette unfastening operation.

We claim:

1. An apparatus for automatically unfastening and opening radiographic film cassettes of the type having a container body for holding a sheet of said film and including bottom and side walls, a lid hinged to one side wall of said body and unlatchable latching means for securing said lid in closed position on said body, said apparatus comprising a housing having an access opening in one wall thereof for the introduction and removal of one of said cassettes into and from the housing interior and including an openable closure for said opening, said housing being substantially light-tight when said closure is closed; a first switch means activated in response to closure of said closure means; means within said housing adjacent said opening for supporting a cassette in a downwardly inclined position with its bottom side up and its hinged end elevated above its opposite end at an angle sufficient to cause the film sheet to slide upon said lid under the action of gravity when the cassette body is clear of said lid, a second switch means associated with said supporting means and activated in response to the presence thereon of a cassette in correctly oriented condition; a cyclically operative cassette unlatching and opening mechanism including a motor drive means for cyclically operating said mechanism when energized and being energized in response to activation of both said switch means, means for engaging said cassette latch and unlatching the same, and means for thereafter engaging a wall of the body of said cassette at a point spaced from the hinge of the latter and for elevating the end of said body remote from said hinge clear from said lid to permit said film sheet to slide along said lid out of said cassette under the force of gravity, and means for receiving the thus released radiographic film.

2. An apparatus according to claim 1, in which said film receiving means includes sheet transport rollers for positively propelling the film sheet after delivery from said opened cassette.

3. An apparatus according to claim 1, in which said cassette elevating means includes a part disposed and operating so as to exert upward cassette opening force on one or more of the side and front walls of the container body of the cassette.

4. An apparatus according to claim 1, in which said cassette supporting means includes an upwardly opening guide channel for receiving a side wall of the container body of a cassette upon introduction thereof into the housing and the cassette elevating means operates by tilting said channel.

5. An apparatus according to claim 1, in which said housing further includes a separate film sheet passageway, closable by a light-tight cover, via which a film sheet can be fed directly to said receiving means.

6. An apparatus according to claim 1, in which said cassette latching means includes a pivotable unlatching lever and said unlatching means includes a rockable arm for pivoting said unlatching lever.

7. An apparatus according to claim 6, in which said rockable arm is operatively connected by at least one belt to a motor-driven disc so that during a rotation of the latter said arm is rocked in a direction to cause displacement of the cassette unlatching lever into unlatching position.

* * * * *